April 16, 1940.  H. G. SCHNEIDER  2,197,023
PRODUCTION OF ETHERS
Filed Nov. 7, 1936
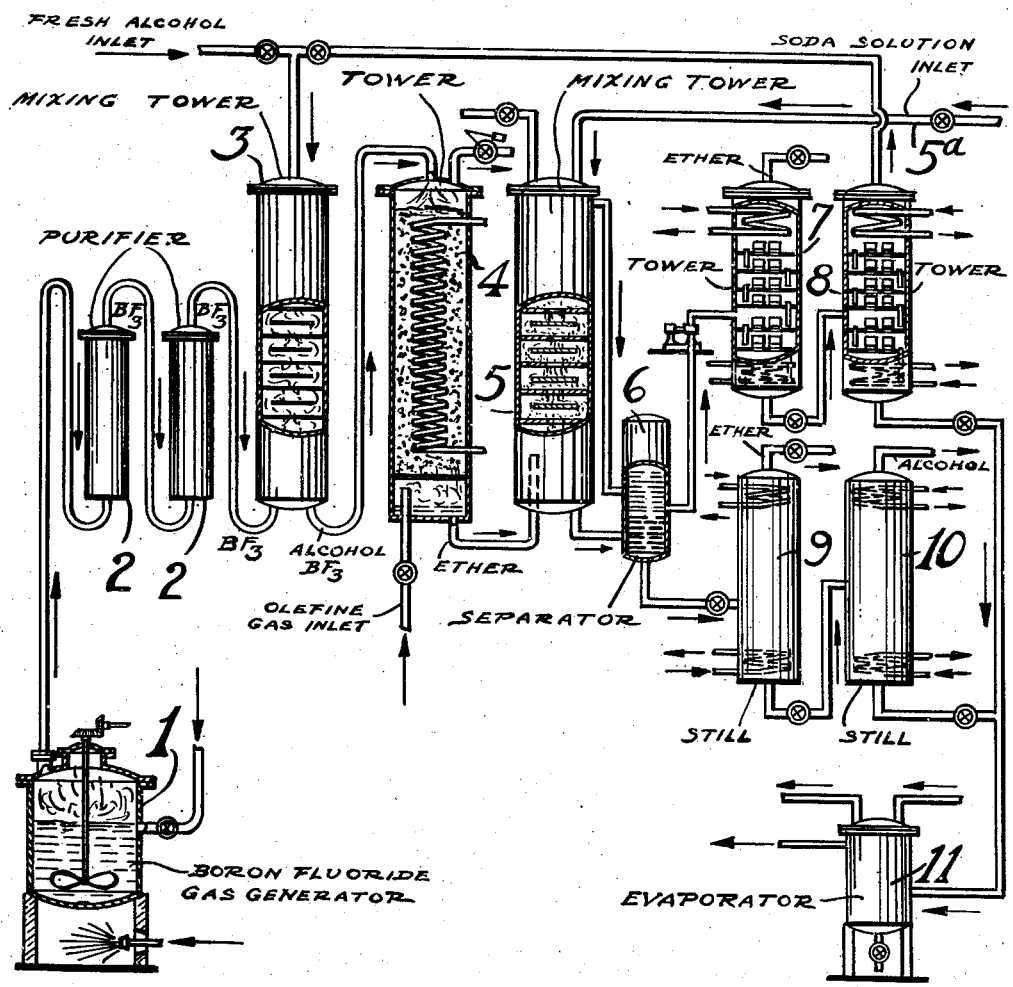
Helmuth G. Schneider Inventor
By P. L. Young Attorney Patented Apr. 16, 1940

2,197,023

UNITED STATES PATENT OFFICE 2,197,023

PRODUCTION OF ETHERS

Helmuth G. Schneider, Roselle, N. J., assignor to Standard Oil Development Company, a corporation of Delaware Application November 7, 1936, Serial No. 109,649

15 Claims. (Cl. 260—614)

This invention relates to the production of organic compounds belonging to the general class of ethers and more particularly to the production of such ethers by the direct reaction of olefines with aliphatic hydroxy compounds.

This application is a continuation-in-part of my application Serial No. 669,147 filed May 3, 1933, now Patent 2,065,540, which disclosed broadly the production of organic compounds, such as ethers, esters, etc., by the direct reaction of olefines with oxygenated organic compounds, such as alcohols, organic acids, etc., in the presence of a motivating agent.

According to the present invention, a direct etherification of an olefine with an aliphatic hydroxy compound, such as an alcohol, is caused to take place at relatively low temperature in the presence of a motivating agent of the boron fluoride type. The reaction in this case, using a tertiary olefine, may be represented by the following equation:

The alcohol may be regarded as splitting in the course of the reaction, the hydrogen of the hydroxyl group combining with one of the carbons in the double bond of the olefine and the rest of the alcohol combining with the carbon at the other side of the double bond in the olefine. Thus a simultaneous etherification and saturation of the olefine is accomplished with the resulting production of a branched ether.

The branched ethers formed find particular adaptation as an anti-knock blending agent according to co-pending application of Hyym E. Buc, Serial No. 648,211, filed December 21, 1932, now Patent 2,046,243. They may also be used as solvents, etc.

Furthermore, this reaction of an alcohol solution of BF₃ with tertiary olefines may be used as a convenient method of separating tertiary olefines from other olefines. For instance, if the olefinic gases available in a petroleum refinery are used in the manufacture of alcohols by absorption with sulfuric acid, the troublesome tertiary olefines may first be removed by scrubbing with a solution of boron fluoride in an alcohol. Such a treatment of the unsaturated gas leaves the primary and secondary olefines unchanged. A similar separation of secondary and tertiary olefines can also be accomplished by treating the mixture with boron fluoride dissolved in an organic acid according to the method mentioned above, in which case the secondary olefines are the ones reacted upon.

When boron fluoride is dissolved in methyl alcohol a molecular complex is apparently formed, containing the two constituents in equimolecular proportions even though an excess of the alcohol is used. In some cases, the motivating agent forms addition compounds with the product and in such cases these addition compounds may be decomposed in any suitable manner in order to liberate the motivating agent, for instance, by hydrolysis with water or caustic soda solution, by distillation, etc.

The invention may be carried out in a number of different ways but it has been found particularly convenient to dissolve the motivating agent, such as boron fluoride, in the alcohol or other liquid aliphatic hydroxy compound and then to agitate this solution with the olefine to be treated, or this preferably is done in a countercurrent system, as in a tower.

With a gaseous olefine this may be conveniently and continuously carried out by the use of a column as shown in the accompanying schematic drawing which is one illustration of the entire process for preparing ethers, beginning with the manufacture of boron fluoride.

Referring to the drawing, numeral 1 is any convenient boron fluoride gas generator in which suitable raw materials such as sulfuric acid, calcium fluoride and boric acid or sodium borate are mixed and heated. The boron fluoride evolved is then purified in a suitable apparatus such as 2 and then is fed in at the bottom of a vertical tower 3 containing filler bodies over which methyl alcohol is allowed to trickle. The boron fluoride dissolves in the alcohol and the solution is collected at the bottom and conveyed to the top of a second tower 4 likewise containing filler bodies over which the alcohol-BF₃ is allowed to trickle downwardly. A suitable olefine gas is fed in at the bottom of this tower thereby reacting with the descending solution of alcohol-BF₃ and producing an ether-BF₃ solution in excess alcohol. Tower 4 is equipped with suitable temperature control apparatus, especially for cooling. The ether-BF₃ solution in alcohol is passed into the base of tower 5, into which a caustic soda solution is fed in at the top by line 5a and allowed to gravitate downward countercurrent to the ascending ether-BF₃ solution in alcohol which has a lighter gravity. After hydrolysis, the products from tower 5 are passed into separator 6 where two layers are formed, the upper layer consisting chiefly of ether and alcohol while the lower layer contains sodium borate, sodium borofluoride and any excess caustic soda which may have been used. The upper ether layer is drawn off from this separator and is then conveyed to suitable fractionating towers 7 and 8 where the ether and residual alcohol are distilled off in any order desired, the alcohol being recycled. Any residual water from 8 may be wasted or may be evaporated if it contains appreciable quantities of solids.

The lower layer from separator 6 is passed into suitable stills 9 and 10 to strip off any dissolved ether and alcohol and the residual aqueous solution is concentrated or evaporated to dryness in suitable apparatus 11, the residue from which may be used to regenerate $BF_3$ if desired.

The pressure in the various units or in the system as a whole may be regulated at will by suitable control valves.

If liquid olefines are used instead of an olefine gas, the reaction may be carried out in a similar manner by countercurrently contacting the lighter olefine liquid with the heavier alcohol liquid containing dissolved $BF_3$.

If desired, a combination process may be used for preparing both the ethers and esters in which case the ester-$BF_3$ solution is first prepared by dissolving $BF_3$ in an acid and treating the solution with a secondary olefine and then treating with the desired alcohol. The latter causes the liberation of the ester with simultaneous formation of an alcohol-$BF_3$ solution which is then further treated with a tertiary olefine to form the ether-$BF_3$ solution and then hydrolyzed to liberate the ether.

Another method of manufacture is to pass the gaseous motivating agent through a mixture of the alcohol and olefine while agitating the same. A still further alternative is to mix the motivating agent and olefine (both in gaseous form) and pass the mixture into the alcohol. In this case, however, care must be taken to prevent the polymerization of the olefine instead of the desired reaction. This may be done by either keeping the temperature sufficiently low or else by diluting with an inert gas in sufficient quantity.

A still further interesting and alternative procedure may be used for treating an olefine mixture containing both secondary and tertiary olefines. For example, the stabilizer bottoms available in a petroleum refinery are first reacted with an organic acid-$BF_3$ solution prepared as described above and then mixed with a suitable hydrocarbon solvent such as a white petroleum oil distillate having an A. P. I. gravity between about 45° to 48° and a boiling range between 150° and 200° C. if desired, although this solvent may not be necessary if a large proportion of saturated hydrocarbons is present. Upon settling, two layers are formed, the lower one containing an ester-$BF_3$ solution and the upper one containing the hydrocarbon solvent and the tertiary olefines left after the removal of the secondary olefines in the reaction. The upper layer is then mixed with an alcohol and fed into the top of a suitable reaction tower while the bottom layer, the ester-$BF_3$ solution, is fed into the bottom of this same reaction tower. By countercurrent mixing, a double reaction takes place. The $BF_3$ is liberated from the ester-$BF_3$ solution and effects a reaction between the alcohol and the tertiary olefine, resulting in the production of an ether-$BF_3$ solution dissolved in the excess alcohol. This solution may be recovered as a bottom layer in a suitable settling tank. Countercurrently with that reaction the ester now liberated from the ester-$BF_3$ solution dissolves in the hydrocarbon solvent and may be recovered as the upper layer in the separating tank. The ester may be recovered from the solvent by distillation and the ether may be recovered from the ether-$BF_3$ solution by the methods previously described.

In this double reaction procedure just described it is observed that the alcohol and tertiary olefine are caused to react by an ester-$BF_3$ solution or complex. In other words, in reactions of the type involved in the present invention the motivating agent may not only be a halide of the boron fluoride type alone but may be a molecular complex of such a compound in conjunction with another compound such as the ester referred to above in the ester-$BF_3$ complex.

Furthermore, instead of using boron fluorides as the motivating agent, other halides of the boron fluoride type may be used such as titanium tetrachloride, silicon fluorides and others. Motivating agents of this type are adapted to react at low temperatures and to cause the direct esterification and other such reactions also at low temperature, thereby substantially avoiding simultaneous polymerization of the olefine.

The present invention is distinctly different from etherification processes involving the use of sulfuric acid or aluminum chloride because sulfuric acid is a condensing agent of an entirely different type which operates by a different chemical reaction mechanism and, on the other hand, aluminum chloride, although being a halide like boron fluoride, works substantially differently. For example, boron fluoride is operative at substantially lower temperatures than aluminum chloride and also $BF_3$ will actually cause reactions to take place which will not occur at all with aluminum chloride. For instance, in preparing esters as claimed in my original application, boron fluoride caused pentene-2 to react with acetic acid at room temperature to produce amyl acetate, whereas aluminum chloride could not be made to effect the same reaction.

As the reactions are usually exothermic, cooling is generally required to keep the temperature sufficiently low. The temperature and pressure to be used will depend to a large extent on the particular raw materials being treated. However, it is usualy desirable to keep the temperature relatively low, that is, between the approximate limits of −100° C. and 100° C., preferably at room temperature, and most reactions can be carried out satisfactorily at atmospheric pressure although if it is desired to speed up the reactions or to operate in the liquid phase, super-atmospheric pressure may be used. The reaction involved is almost quantitative on the basis of the motivating agent used.

This invention is applicable to both lower and higher members of the olefine series. The unsaturation need not occur in open chain aliphatic hydrocarbons but may be part of a ring or cyclic compound such as cyclohexene. Also, instead of using single olefine hydrocarbons, mixtures of such pure compounds or mixtures of unsaturated hydrocarbons and saturated hydrocarbons such as occur in petroleum products either naturally or as a result of various refining, cracking, or other treating processes, or any other unsaturated hydrocarbon product resulting from any other industrial process may be used.

Although olefines are included broadly within the scope of this invention for the preparation of ethers, it is preferred to use tertiary olefines particularly for reaction with primary alcohols, especially the lower aliphatic ones.

The aliphatic hydroxy compounds to be used include not only the lower aliphatic primary alcohols, such as methyl and ethyl alcohols, but also higher ones such as butyl, amyl, decyl, and even higher mono-hydroxy aliphatic alcohols, as well as various di-hydroxy and other poly-hydroxy alcohols, such as ethylene glycol, propylene glycol, glycerol, and also higher molecular weight aliphatic poly-hydroxy compounds of the carbohydrate type including sugars, cotton, cellulose, etc.

Generally, less than the saturation amount of boron fluoride in the alcohol should be used, because if much larger proportions of boron fluoride are used there is a tendency to cause polymerization of the tertiary olefine in preference to ether formation. Preferably not more than 1 mol of $BF_3$ per mol of alcohol should be used, and no matter how large an excess of alcohol or olefine is used, 1 mol of $BF_3$ will give 1 mol of ether. The most efficient manner of utilizing the reaction is to treat the olefine with a slight excess of the alcohol-$BF_3$ reagent.

Under some circumstances, it is desirable to carry out the reaction in the presence of an inert solvent, for example, when using normally solid aliphatic hydroxy compounds such as the carbohydrates referred to above, as well as when using some of the higher viscous liquid or solid olefines. Suitable solvents include petroleum hydrocarbons, particularly saturated aliphatic hydrocarbons, as well as other classes of chemical compounds such as aliphatic ethers, for instance, ethyl ether, isopropyl ether, and the like.

Generally, the reaction should be carried out below about 100° C. and preferably below 50° C. and under some circumstances may be carried out as low as −20° or −50° C., although ordinarily, from the point of view of convenience and economy, ordinary room temperature is satisfactory, making provision for heating the reaction slightly to initiate it, if necessary, and also with provision for cooling the reaction mass if the temperature rises excessively.

Although the reaction may ordinarily be carried out at atmospheric pressure, it may be desirable at times to use super-atmospheric pressure up to 10 or 20 atmospheres, for instance, for effecting an accelerated reaction or for carrying out a reaction with normally volatile materials or in the presence of a liquefied normally gaseous solvent such as liquefied propane and the like.

The following examples are given for the purpose of illustration only:

*Example 1*

A 50 cc. sample of a solution of 55 grams of boron fluoride in 100 ccs. of methyl alcohol was reacted with 70 ccs. of trimethyl ethylene at room temperature for 240 minutes. 60 ccs. of the product boiling at 80-85° C. were obtained. On purification this proved to be methyl tertiary amyl ether (B. P. 86° C.).

*Example 2*

A solution of 84.7 grams of $BF_3$ in 150 ccs. of methyl alcohol (making a total volume of 175 ccs.) was prepared. 30 ccs. of this solution were reacted with 86 ccs. of trimethyl ethylene, keeping the temperature below 30° C. As a result, 42 ccs. of a product boiling about 80-87° C. was obtained. This product was identified as above to be methyl tertiary amyl ether after purification.

*Example 3*

38 ccs. of the methyl alcohol-$BF_3$ solution prepared in Example 2 were reacted with 21.5 grams of isobutylene at room temperature. As a result, 45 ccs. of ether product was obtained, the ether in this case being methyl tertiary butyl ether (B. P. 55.3° C.)

It is not desired to be limited by the foregoing examples or theories of the operation of the invention but by the following claims in which it is my intention to claim all novelty inherent in the invention as broadly as the prior art permits.

I claim:

1. The process of preparing ethers which comprises reacting an aliphatic alcohol with a tertiary olefine at a temperature below about 100° C. in the presence of a normally gaseous and liquid halide of an inorganic metal of groups III and IV of the periodic system.

2. Process according to claim 1 in which the halide used is selected from the group consisting of boron fluoride, organic complexes of boron fluoride, titanium tetrachloride and silicon fluoride.

3. Process according to claim 1 in which boron fluoride is used as motivating agent.

4. Process according to claim 1 in which the aliphatic hydroxy compounds used contain at least one primary hydroxy group.

5. Process according to claim 1 in which lower aliphatic primary alcohols are used.

6. Process according to claim 1 in which an aliphatic poly-hydroxy alcohol is used.

7. Process according to claim 1 in which tertiary olefines are used.

8. Process according to claim 1 carried out at a temperature below about 100° C.

9. Process according to claim 1 carried out at about room temperature.

10. The process of preparing ethers which comprises reacting aliphatic primary alcohols with tertiary olefines in the presence of boron fluoride at a temperature not substantially above room temperature.

11. The process of preparing ethers, which comprises reacting an aliphatic primary monohydroxy alcohol with a tertiary olefine at a temperature below 100° C. in the presence of boron fluoride.

12. Process according to claim 11 in which an excess of the alcohol is used over that required for etherification with the olefine.

13. Process according to claim 11 in which the amount of boron fluoride used is less than the amount required to saturate the alcohol used.

14. The process of preparing ethers, which comprises dissolving boron fluoride in an aliphatic primary mono-hydroxy alcohol having not more than 10 carbon atoms, the amount of boron fluoride used being insufficient to saturate said alcohol, and then contacting said solution with a tertiary olefine at a temperature below 100° C.

15. The process of preparing mixed methyl ethers, which comprises reacting methyl alcohol with a tertiary olefine at a temperature below 100° C. in the presence of boron fluoride.

HELMUTH G. SCHNEIDER.